US011992983B2

(12) United States Patent
Takagiwa et al.

(10) Patent No.: US 11,992,983 B2
(45) Date of Patent: May 28, 2024

(54) METHOD OF MANUFACTURING RESIN RETAINER HAVING TWO ANNULAR SECTIONS

(71) Applicant: NAKANISHI METAL WORKS CO., LTD., Osaka (JP)

(72) Inventors: Shinya Takagiwa, Osaka (JP); Osamu Fukuda, Osaka (JP)

(73) Assignee: NAKANISHI METAL WORKS CO., LTD., Osaka (JP)

( * ) Notice: Subject to any disclaimer, the term of this patent is extended or adjusted under 35 U.S.C. 154(b) by 204 days.

(21) Appl. No.: 17/754,195

(22) PCT Filed: Jun. 29, 2020

(86) PCT No.: PCT/JP2020/025517
§ 371 (c)(1),
(2) Date: Mar. 25, 2022

(87) PCT Pub. No.: WO2021/070432
PCT Pub. Date: Apr. 15, 2021

(65) Prior Publication Data
US 2022/0297359 A1 Sep. 22, 2022

(30) Foreign Application Priority Data
Oct. 8, 2019 (JP) ................................. 2019-185469

(51) Int. Cl.
*B29C 45/04* (2006.01)
*B29C 45/17* (2006.01)
(Continued)

(52) U.S. Cl.
CPC ...... *B29C 45/0416* (2013.01); *B29C 45/1742* (2013.01); *B29C 45/33* (2013.01);
(Continued)

(58) Field of Classification Search
CPC .. B29C 45/44; B29C 45/4435; B29C 45/4471
See application file for complete search history.

(56) References Cited

U.S. PATENT DOCUMENTS 6,315,456 B1   11/2001   Tanimoto et al.

FOREIGN PATENT DOCUMENTS

| JP | 2003311791 A | 11/2003 |
| JP | 2005225032 A | 8/2005 |

(Continued)

OTHER PUBLICATIONS

International Search Report dated Aug. 4, 2020 from corresponding PCT Application No. PCT/JP2020/025517.

*Primary Examiner* — Edmund H Lee
(74) *Attorney, Agent, or Firm* — INNOVATION CAPITAL LAW GROUP, LLP; Vic Lin

(57) ABSTRACT

Provided is a method of manufacturing a resin retainer having two annular sections. A fixed-side cavity forming mold has a first axial mold surface that is in contact with an axial end surface of a first annular section of the annular sections of a resin retainer having two annular sections, and a first protruding portion protruding from the first axial mold surface. A movable-side cavity forming mold has a second axial mold surface that is in contact with an axial end surface of a second annular section of the annular sections of the resin retainer, and a second protruding portion protruding from the second axial mold surface. A slide core sliding step is performed in which slide cores are slid toward an outer diameter and pocket-forming protruding portions of the slide cores are extracted from a pocket of the retainer, and then a mold opening step is performed in which the movable-side cavity forming mold is opened relative to the fixed-side cavity forming mold.

4 Claims, 15 Drawing Sheets

(51) Int. Cl.
   *B29C 45/33*    (2006.01)
   *B29C 45/40*    (2006.01)
   *F16C 33/38*    (2006.01)
   *F16C 33/46*    (2006.01)

(52) U.S. Cl.
   CPC ............ *B29C 45/401* (2013.01); *F16C 33/38* (2013.01); *F16C 33/46* (2013.01)

(56) References Cited

FOREIGN PATENT DOCUMENTS

| | | |
|---|---:|---|
| JP | 3700780 B2 | 9/2005 |
| JP | 2007198469 A | 8/2007 |
| JP | 2010110916 A | 5/2010 |
| JP | 4793482 B2 | 10/2011 |
| JP | 2013160333 A | 8/2013 |
| JP | 2014101946 A | 6/2014 |
| JP | 2017072206 A | 4/2017 |
| JP | 2019074097 A | 5/2019 |
| WO | 2012128349 A1 | 9/2012 |

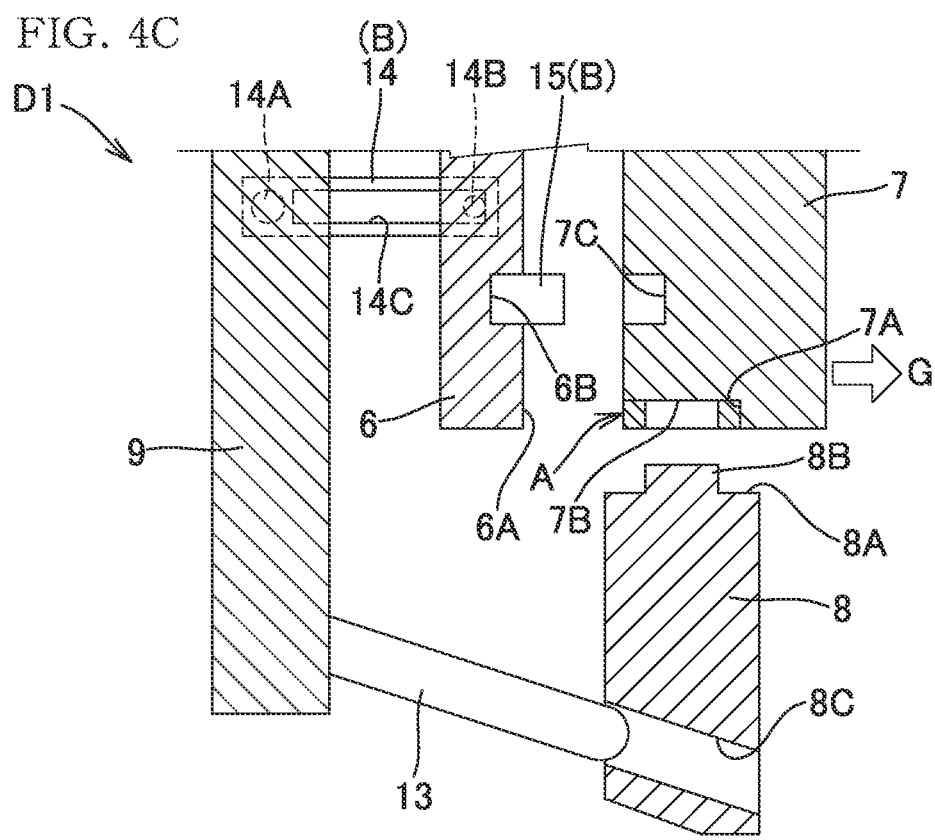

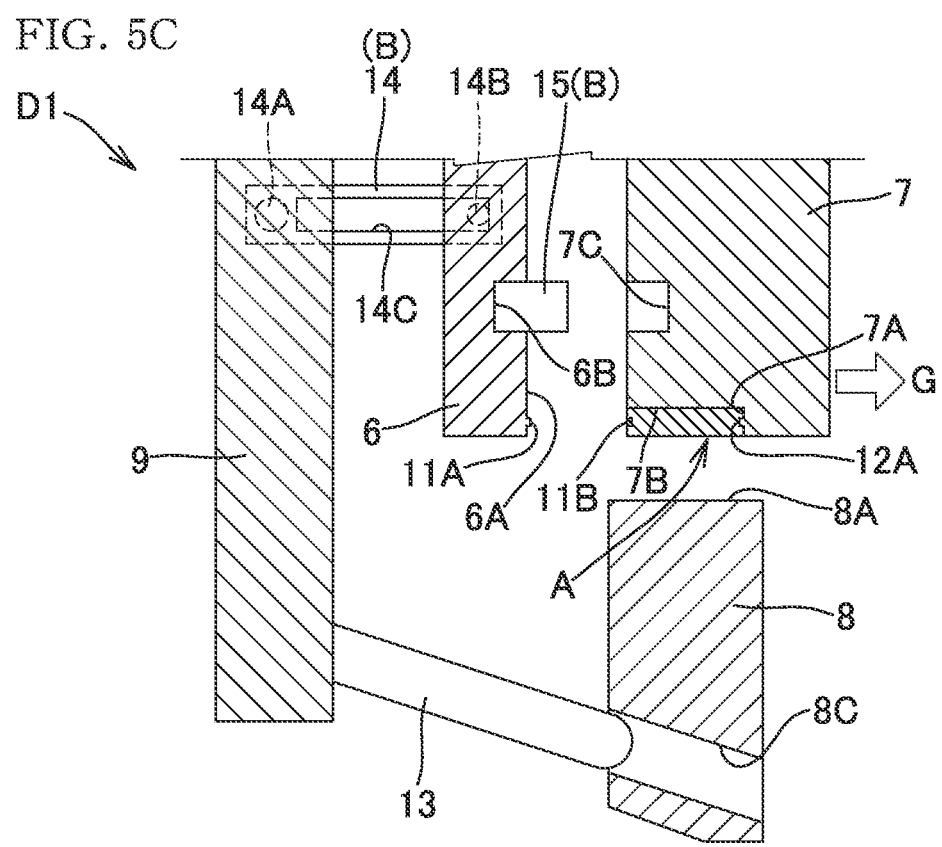

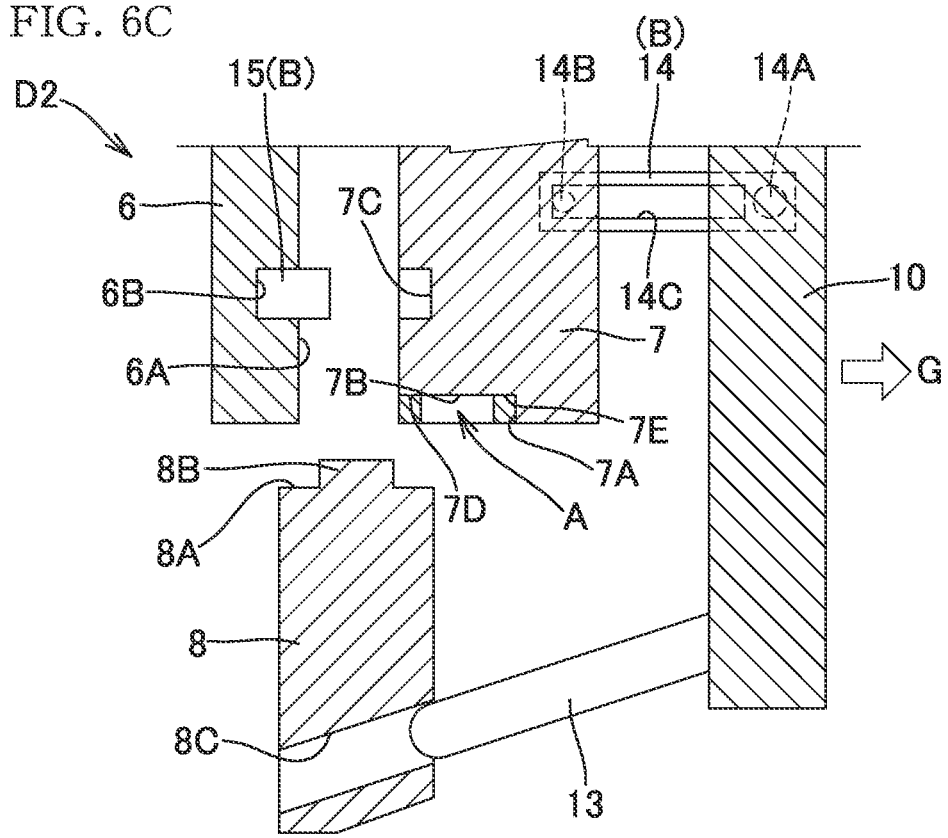

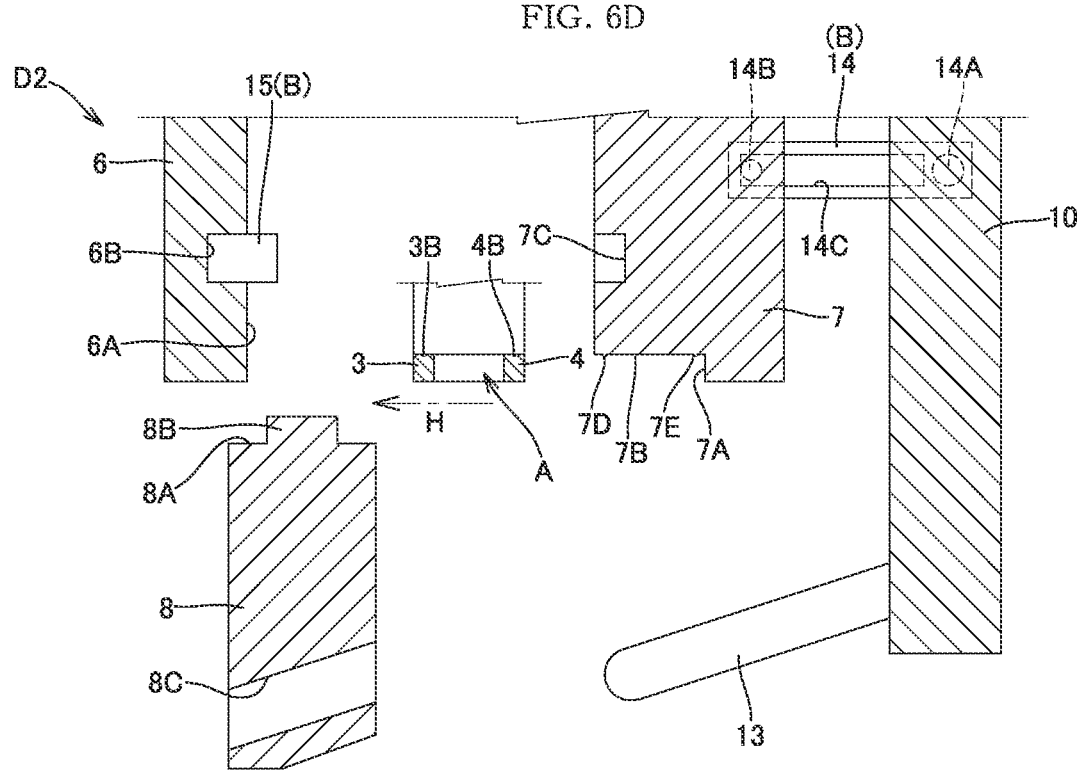

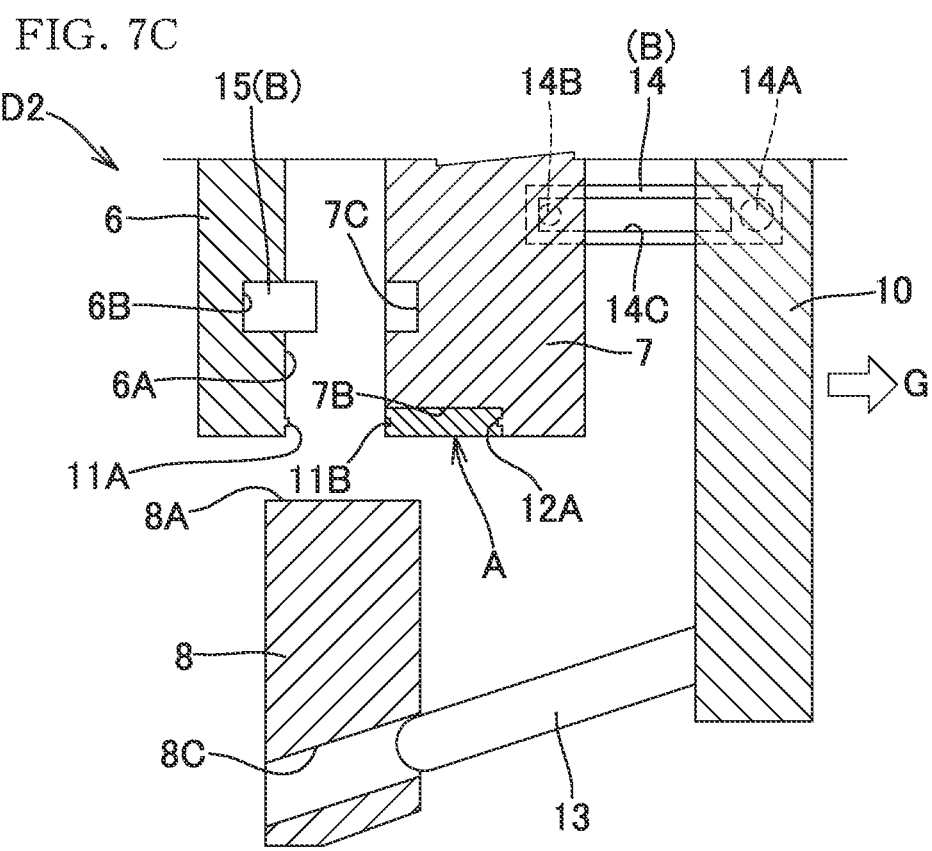

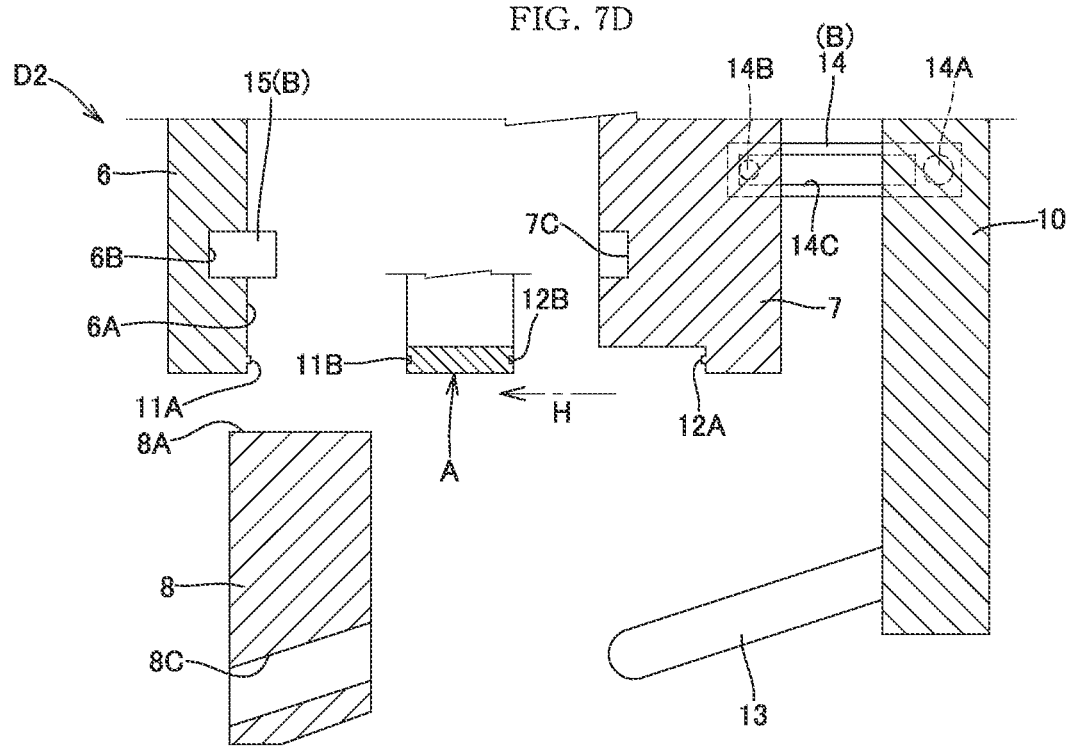

METHOD OF MANUFACTURING RESIN RETAINER HAVING TWO ANNULAR SECTIONS

TECHNICAL FIELD

The present invention relates to a method of manufacturing an outer-ring guided resin retainer having two annular sections, by injection molding.

BACKGROUND ART

A resin retainer having two annular sections is one of retainers used for rolling bearings including a cylindrical roller bearing and an angular ball bearing. The resin retainer having two annular sections has a shape in which annular sections in pair, which are separated axially, are connected by a plurality of columns provided in a circumferential direction of the annular sections at an equal interval (see cylindrical roller bearing retainers disclosed in Patent Literatures 1 and 2, ball bearing retainers disclosed in Patent Literatures 3 and 4, and a cylindrical roller bearing retainer and a ball bearing retainer disclosed in Patent Literature 5, for example).

Regarding the resin retainer having two annular sections, there is an outer-ring guided retainer that has an outer peripheral surface guided by an inner peripheral surface of the outer ring of a rolling bearing. If the outer peripheral surface of the retainer has a burr that protrudes in a radially outward direction, the burr slidably contacts with the inner peripheral surface of the outer ring.

This may cause abrasion of the inner peripheral surface of the outer ring of the rolling bearing or torque fluctuation in the rolling bearing. This consequently causes a failure in operation of the rolling bearing (see Patent Literature 2, paragraph [0007], and Patent Literature 5, paragraph [0006], for example). In addition, the burr of the retainer may come into contact with the inner peripheral surface of the outer ring, and may fall in the rolling bearing. This may cause the burr to be bitten between rolling elements and the outer ring or the inner ring of the rolling bearing, to cause a failure in the operation of the rolling bearing.

CITATION LIST

Patent Literature

Patent Literature 1: JP 2019-074097 A
Patent Literature 2: Japanese Patent No. 3700780
Patent Literature 3: JP 2007-198469 A
Patent Literature 4: Japanese Patent No. 4793482
Patent Literature 5: JP 2014-101946 A
Patent Literature 6: JP 2003-311791 A

SUMMARY OF INVENTION

Technical Problem

A pocket between adjacent columns of a retainer is an undercut part. Accordingly, when the resin retainer having two annular sections is manufactured by injection molding, slide cores are used for forming the pocket and taking a molded article out from an injection molding die (see FIGS. 3, 4, and 6 of Patent Literature 2, and FIGS. 2 and 3 of Patent Literature 4).

In the mold structure using slide cores, a mold 20 of Patent Literature 2 includes, for example, a mold part 21 (FIG. 4) for forming an inner peripheral surface of a retainer 10, a pair of mold parts 22 (FIG. 4) for forming an annular section 11 of the retainer 10, and slide cores 23 for forming pockets 13 and columns 12 of the retainer 10.

In the mold 20 of Patent Literature 2, burrs that extend radially outward are generated respectively in parting lines L1 extending in the axial direction between adjacent slide cores 23, and in parting lines L2 extending in the circumferential direction between the slide cores 23 and the mold part 22 (see parting lines L1 and L2 in FIG. 5).

The retainer 10 of Patent Literature 2 is provided with annular projections 14 projecting outward, at an outer peripheral surface of each of the annular sections 11. Accordingly, burrs that extend radially outward and are generated at the parting lines L1 extending in the axial direction do not come into contact with the inner peripheral surface of an outer ring 1. In addition, the burr that extends radially outward and is generated at the parting line L2 extending in the circumferential direction is removed through barrel processing (see paragraph [0029]).

In Patent Literature 5, a burr that extends radially outward and is generated at a parting line L1 extending in the axial direction is generated within a concave portion 10 extending in the axial direction of a column 4b, so as to be prevented from coming into contact with an inner peripheral surface of an outer ring 2. Patent Literature 5 does not disclose a burr that extends radially outward and is generated at the parting line L2 extending in the circumferential direction.

In the mold structure using slide cores, which is adopted in the present invention, an outer periphery molding surface 8A that is in contact with an outer peripheral surface of a resin retainer A having two annular sections is provided in a slide core 8, with reference to FIGS. 3B and 4B, for example. In this case, burrs that are respectively generated at a parting line extending in the circumferential direction between the outer periphery molding surface 8A of the slide core 8 and a fixed-side cavity forming mold 6, as well as a parting line extending in the circumferential direction between the outer periphery molding surface 8A of the slide core 8 and a movable-side cavity forming mold 7 extend in the axial direction. Accordingly, the burr, which extends radially outward and causes a problem in an outer-ring guided retainer, is never generated on the outer peripheral surface F of the resin retainer A having two annular sections.

If the outer periphery molding surface that is in contact with the outer peripheral surface of the resin retainer having two annular sections is provided in the slide core, there is no mold that holds the outer peripheral surface of the retainer when the slide cores are extracted.

Patent Literature 1 discloses that a column 7 of a cylindrical roller bearing retainer 5 has, at its outer-diameter end portion, a pair of claw portions 7a in the circumferentially both sides (see paragraph [0041] and FIG. 2). When the retainer 5 having such a shape is manufactured through injection molding, it is necessary to perform a forcible extraction of slide cores at the time of opening slide cores 9 in a radially outward direction upon mold release (see paragraph [0044] and FIG. 3).

Patent Literature 3 discloses a ball bearing retainer 4, in which a pocket 5 has a guiding surface 5a that is in contact with a ball 3 and is coarsely formed to have the surface roughness Ra of 6 to 10 µm (see paragraph [0018] and FIGS. 1 and 2). When the retainer 4 having such a shape is manufactured through injection molding, a mold structure shown in FIGS. 2 and 3 of Patent Literature 4 is used.

For forming the guiding surface 5a of the pocket 5 in the ball bearing retainer 4 in Patent Literature 3, it is necessary to set the surface roughness of a part of the slide core (a molding die D4 in Patent Literature 4, for example), at which the guiding surface 5a is molded, to be Ra 6 to 10 μm. Accordingly, it is necessary to perform the forcible extraction at the time of opening the slide cores (e.g., a molding die D4 of Patent Literature 4) in the radially outward direction, relative to the guiding surface 5a having the coarse surface, in the pocket 5 (a pocket 6 in Patent Literature 4).

In the resin retainer having two annular sections, which is required to undergo the forcible extraction, the outer periphery molding surface that is in contact with the outer peripheral surface of the retainer may be provided in the slide core. In such a case, there is no mold that holds the outer peripheral surface of the retainer when the slide cores are removed, as described above. Accordingly, the forcible extraction at the time of opening the slide cores in the radially outward direction upon mold release provides load to a molded article, causing annular sections of the resin retainer having two annular sections to be deformed in the radial direction.

In Patent Literatures 2 and 4, the outer peripheral surface of each of the annular sections (e.g., the annular section 11 in Patent Literature 2) of the resin retainer having two annular sections is held by a molding die (e.g., the molding die 22 in FIG. 4 of Patent Literature 2). In this case, if the molding die (e.g., the molding die 22 of Patent Literature 2) placed in a fixed side is removed before the slide cores are completely removed, it is concerned that the annular section is deformed in the radial direction. However, a connection mechanism (a tension link) as is provided in an injection molding die of Patent Literature 6 is adopted, allowing the molding die (e.g., the molding die 22 of Patent Literature 2) to be moved after the slide cores are removed.

The inventers of the present application have focused on a case in which the annular section of the retainer is deformed, and thus fails in satisfying the required specification when manufacturing the resin retainer having two annular sections by injection molding using a mold structure including the slide cores each having the outer periphery molding surface that is in contact with the outer peripheral surface of the resin retainer having two annular sections. Then, various shapes of the resin retainer having two annular sections have been examined and evaluated in terms of the injection molding performed thereto, and the knowledge has been obtained that the load acting on a molded article at the time of opening the slide cores of the injection molding die in the radially outward direction causes the annular sections of the resin retainer having two annular sections to be deformed in the radial direction.

Regarding an outer-ring guided retainer in which the outer peripheral surface of the retainer is guided by the inner peripheral surface of the outer ring of a rolling bearing, in the resin retainer having two annular sections, if there is a deformation in the annular sections, problems such as abnormal abrasion of the retainer may occur in addition to an operation failure of the rolling bearing due to a burr. In addition, accuracy (circularity or the like) in the outer peripheral surface of the outer-ring guided retainer is extremely strict.

In the mold structure including a slide core as in the invention of Patent Literature 6, the slide core does not have an outer periphery molding surface that is in contact with the outer peripheral surface of a molded article. Thus, the problem on which the present invention focuses does not occur.

The present invention has been made in view of the above situation. An object of the present invention is to provide a manufacturing method in which deformation of an annular section in the radial direction can be inhibited when an outer-ring guided resin retainer having two annular sections is manufactured by injection molding.

Solution to Problem

The substance of the present invention is as follows.

[1]
A method of manufacturing a resin retainer having two annular sections, by injection molding,
the retainer having a shape in which annular sections in pair, which are separated from each other in an axial direction, are connected by a plurality of columns provided in a circumferential direction of the annular sections at an equal interval,
the injection molding being performed using an injection molding die that includes:
a fixed-side cavity forming mold;
a movable-side cavity forming mold; and
slide cores,
the fixed-side cavity forming mold having: a first axial mold surface that is in contact with an axial end surface of a first annular section of the annular sections of the retainer; and a first protruding portion protruding from the first axial mold surface,
the movable-side cavity forming mold having: a second axial mold surface that is in contact with an axial end surface of a second annular section of the annular sections of the retainer; and a second protruding portion protruding from the second axial mold surface,
one of the fixed-side cavity forming mold and the movable-side cavity forming mold having an inner periphery molding surface that is in contact with an inner peripheral surface of the retainer, and
each of the slide cores, which has: an outer periphery molding surface that is in contact with an outer peripheral surface of the retainer; and a pocket-forming protruding portion for forming a pocket between the columns adjacent to each other,
the method including:
a molten resin material charging step of charging a molten resin material in a cavity of the injection molding die, after the injection molding die is closed and clamped;
a molten resin material cooling step of cooling and solidifying the molten resin material;
a slide core sliding step of sliding the slide cores in a radially outward direction to extract the pocket-forming protruding portions of the slide cores from the pocket of the retainer;
a mold opening step of opening the movable-side cavity forming mold relative to the fixed-side cavity forming mold; and
a molded article taking-out step of taking the retainer molded by the injection molding die out from the injection molding die.

[2]
The method of manufacturing a resin retainer having two annular sections, according to [1], in which
the first protruding portion of the fixed-side cavity forming mold and the second protruding portion of the movable-side cavity forming mold are provided to interpose therebetween each of the columns of the retainer.

[3] The method of manufacturing a resin retainer having two annular sections, according to [1] or [2], in which the second protruding portion of the movable-side cavity forming mold is a distal end portion of an ejector pin for pushing a molded article in the molded article taking-out step, the ejector pin being provided in the movable-side cavity forming mold.

[4] The method of manufacturing a resin retainer having two annular sections, according to any one of [1] to [3], in which the injection molding die includes a fixed-side main body and a movable-side main body, and an angular pin is provided in the fixed-side main body or the movable-side main body, the angular pin being inserted in an angular pin insertion hole provided in the slide core, and the injection molding die includes a connection mechanism that allows the movable-side cavity forming mold to be opened relative to the fixed-side cavity forming mold, after the pocket-forming protruding portions of the slide cores are extracted from the pocket of the retainer Effect of Invention The manufacturing method of the resin retainer having two annular sections according to the present invention has the following effects.

(1) The method of manufacturing the resin retainer having two annular sections, according to the present invention, includes the slide core sliding step in which the slide cores are slid in the radially outward direction so as to allow the pocket-forming protruding portions of the slide cores to be extracted from the pockets of the resin retainer having two annular sections, before the mold opening step in which the movable-side cavity forming mold is opened relative to the fixed-side cavity forming mold.

(2) In the injection molding die used in the injection molding in the method of manufacturing the resin retainer having two annular sections, according to the present invention, the fixed-side cavity forming mold has the first protruding portion protruding from the first axial mold surface that is in contact with the axial end surface of the annular section that is one of the annular sections of the resin retainer having two annular sections, and the movable-side cavity forming mold has the second protruding portion protruding from the second axial mold surface that is in contact with the axial end surface of the annular section that is the other one of the annular sections of the resin retainer having two annular sections.

(3) In the axial end surfaces of the respective annular sections in pair in the molded resin retainer that has been molded, the concave portions are respectively formed, to which the first protruding portion of the fixed-side cavity forming mold and the second protruding portion of the movable-side cavity forming mold are respectively fitted. In this state, the slide core sliding step is performed.

(4) Accordingly, a pair of the annular sections are supported by the fitting of the concave portion and the protruding portion in the axial direction between the fixed-side cavity forming mold and the movable-side cavity forming mold, even if, in the slide core sliding step, the forcible extraction is required at the time of extracting the pocket-forming protruding portions of the slide cores from the pocket of the resin retainer having two annular sections or a portion around the pocket of the resin retainer having two annular sections sticks to each of the slide cores due to the mold shrinkage. Therefore, a pair of the annular sections are prevented from deforming in the radial direction.

BRIEF DESCRIPTION OF DRAWINGS

FIG. 4C is a major-part enlarged cross sectional view showing, at the cross section of the pocket of the resin retainer having two annular sections, a molding die opening step of opening a movable-side cavity forming mold relative to a fixed-side cavity forming mold, in the manufacturing method.

FIG. 5C is a major-part enlarged cross sectional view showing, at the cross section of the column of the resin retainer having two annular sections, the molding die opening step of opening the movable-side cavity forming mold relative to the fixed-side cavity forming mold, in the manufacturing method.

FIG. 6C is a major-part enlarged cross sectional view showing, at the cross section of the pocket of the resin retainer having two annular sections, a molding die opening step of opening a movable-side cavity forming mold relative to a fixed-side cavity forming mold, in the manufacturing method.

FIG. 6D is a major-part enlarged cross sectional view showing, at the cross section of the pocket of the resin retainer having two annular sections, a molded article taking-out step of taking a molded resin retainer having two annular sections out from the injection molding die, in the manufacturing method.

FIG. 7C is a major-part enlarged cross sectional view showing, at the cross section of the column of the resin retainer having two annular sections, the molding die opening step of opening the movable-side cavity forming mold relative to the fixed-side cavity forming mold, in the manufacturing method.

FIG. 7D is a major-part enlarged cross sectional view showing, at the cross section of the column of the resin retainer having two annular sections, the molded article taking-out step of taking the molded resin retainer having two annular sections out from the injection molding die, in the manufacturing method.

DESCRIPTION OF EMBODIMENTS

Hereinafter, embodiments of the present invention are described in detail, with reference to the accompanying drawings.

A resin retainer having two annular sections, which is manufactured through a method of manufacturing the resin retainer having two annular sections, according to an embodiment of the present invention, is attached to a rolling bearing. In this state, a direction of a rotation axis of the rolling bearing is referred to as an "axial direction", and a direction perpendicular to the axial direction is referred to as a "radial direction" in the description.

<Example of Resin Retainer Having Two Annular Sections>

Figure 1A:
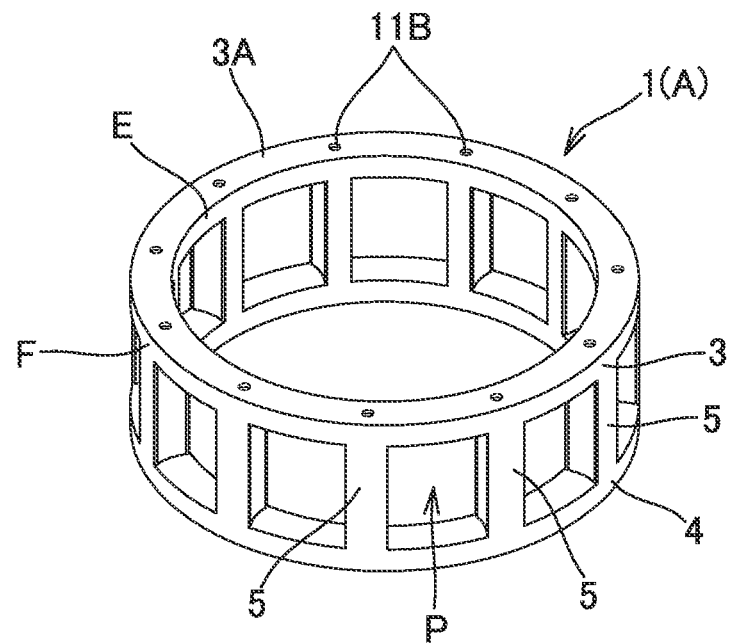
FIG. 1A is a perspective view of a cylindrical roller bearing retainer that is a resin retainer having two annular sections manufactured by a method of manufacturing the resin retainer having two annular sections, according to an embodiment of the present invention.
Figure 2A:
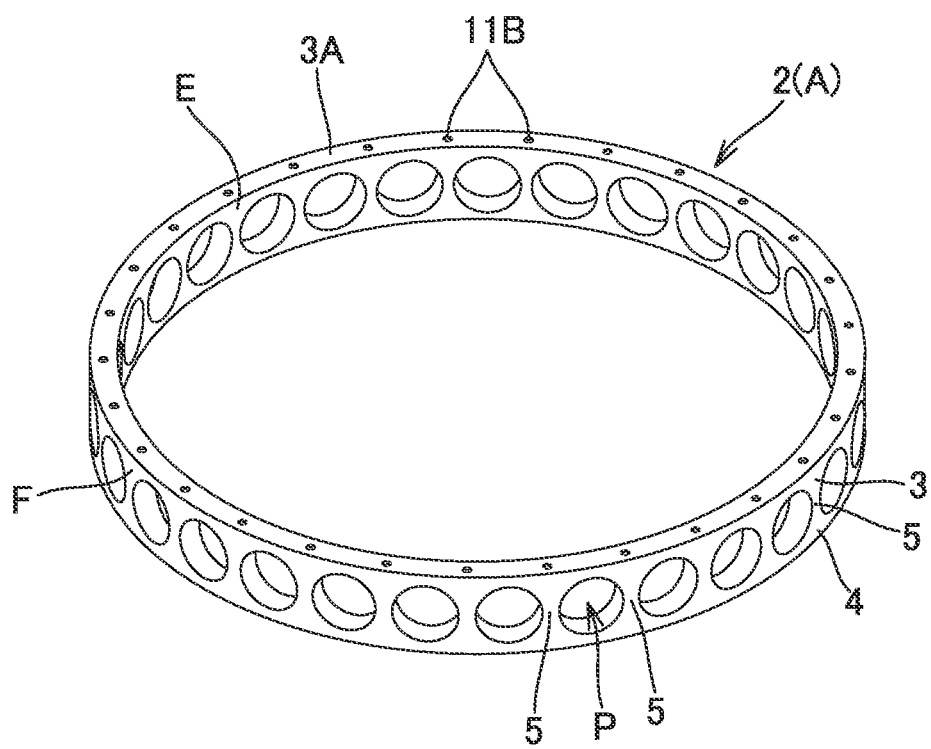
FIG. 2A is a perspective view of a ball bearing retainer that is the resin retainer having two annular sections manufactured by the method of manufacturing the resin retainer having two annular sections, according to the embodiment of the present invention.

A resin retainer A having two annular sections, which is manufactured by a method of manufacturing the resin retainer A having two annular sections, according to the embodiment of the present invention, is a cylindrical roller bearing retainer 1 shown in the perspective view of FIG. 1A, and a ball bearing retainer 2 shown in a perspective view of FIG. 2A, for example.

The resin retainer A having two annular sections has a shape in which annular sections 2 and 3 in pair, separated from each other in the axial direction, are connected by a plurality of columns 5 provided in the circumferential direction of the annular sections at an equal interval. A space between the adjacent columns 5 is a pocket P that retains a rolling element (a cylindrical roller in the cylindrical roller bearing retainer 1 in FIG. 1A, and a ball in a ball bearing retainer 2 in FIG. 2A).

Figure 1B:
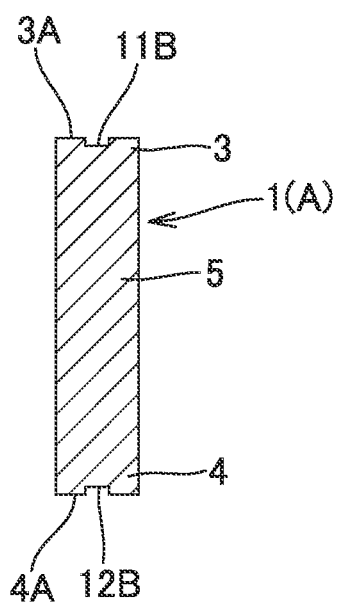
FIG. 1B is an end view of a cut portion obtained by cutting a column of the retainer shown in FIG. 1A at a plane including an axial direction and a radial direction.
Figure 2B:
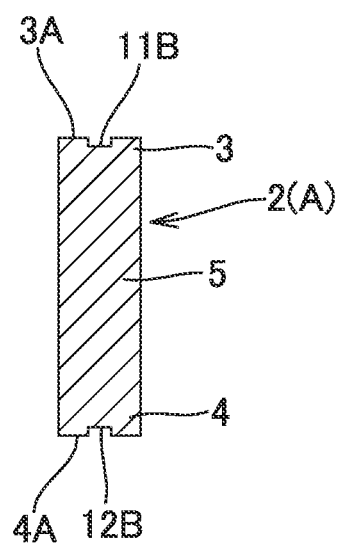
FIG. 2B is an end view of a cut portion obtained by cutting a column of the retainer shown in FIG. 2A at a plane including the axial direction and the radial direction.

As shown in the perspective views of FIGS. 1A and 2A, and the cut end surface views of FIGS. 1B and 2B, the resin retainer A having two annular sections has concave portions 11B on an axially end surface 3A of the annular section 3, and concave portions 12B on an axially end surface 4A of the annular section 4.

As shown in the cut end surface views of FIGS. 1B and 2B, it is preferable that the concave portions 11B and 12B are respectively provided at positions at which the column 5 is interposed between each concave portion 11B and each concave portion 12B. With this configuration, the column 5 having high rigidity is vertically interposed between the annular sections. Accordingly, when the resin retainer A having two annular sections is manufactured through injection molding described later, the annular sections 3 and 4 of the retainer A are easily prevented from being deformed.

The concave portions 11B and 12B may be provided at positions other than the positions interposing the column 5, and circumferential angle positions of the concave portion 11B formed in the annular section 3 and the concave portion 12B formed in the annular section 4 may not be the same. As shown in the perspective views of FIGS. 1A and 2A, and cut end surface views of FIGS. 1B and 2B, it is preferable that the concave portions 11B and 12B are respectively provided at the positions at which every column 5 is interposed by each of the concave portions 11B and each of the concave portions 12B. With this configuration, the annular sections 3 and 4 of the resin retainer A having two annular sections are uniformly held during the injection molding described later, effect of preventing the annular sections 3 and 4 of the retainer A from being deformed is enhanced.

<Examples of Function, Operation, and Forcible Extraction of Slide Cores>

When the resin retainer A having two annular sections as shown in FIGS. 1A and 1B is manufactured by injection molding, pockets P respectively provided between the adjacent columns 5 are undercut portions. Accordingly, a slide core sliding in a direction perpendicular to a mold-opening direction along which an injection molding die is opened is used for forming the pocket P and taking a molded article out from the injection molding die.

Figure 3A:
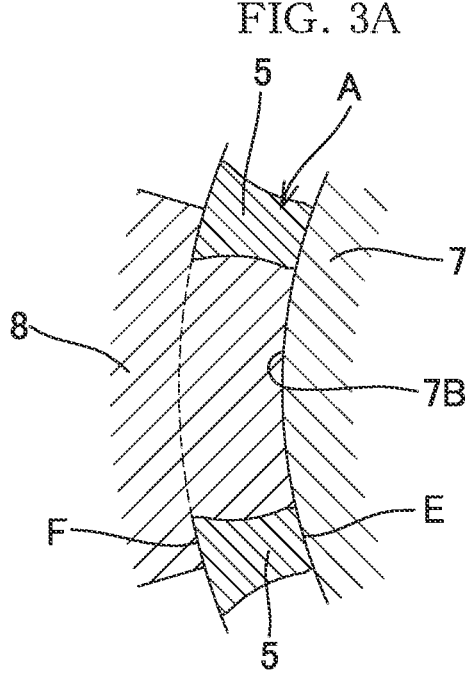
FIG. 3A is a major-part enlarged cross sectional view of a slide core, viewed in a mold-opening direction along which an injection molding die is opened, which shows a state of molding the resin retainer having two annular sections.
Figure 3B:
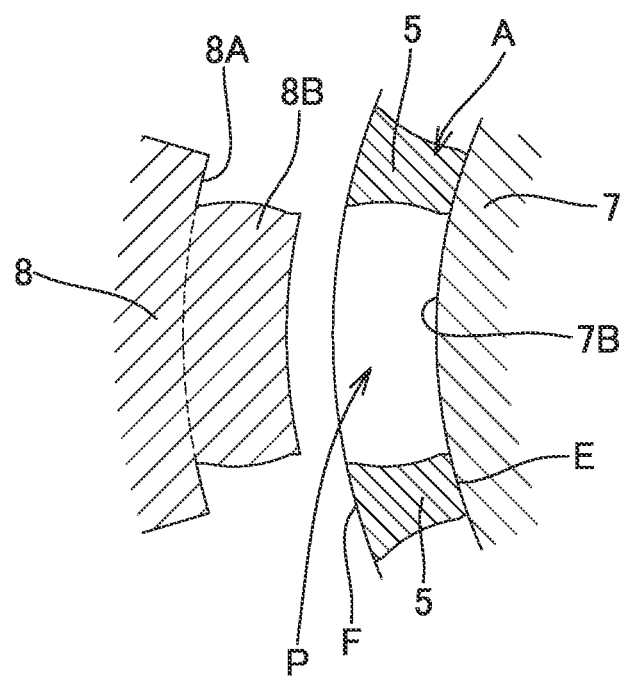
FIG. 3B is a major-part enlarged cross sectional view of the slide core, viewed in the mold-opening direction along which the injection molding die is opened, which shows a state of sliding the slide core in a radially outward direction after the resin retainer having two annular sections is molded.

The major-part enlarged cross sectional views of the slide core, as in FIGS. 3A and 3B, which are viewed in the mold-opening direction, show an example of the function, operation, and forcible extraction of a slide core 8. It is necessary, for the resin retainer A having two annular sections, to perform the forcible extraction of the slide cores 8, due to the shape of the retainer A.

The slide core 8 has an outer periphery molding surface 8A in contact with an outer peripheral surface F of the resin retainer A having two annular sections, and a pocket-forming protruding portion 8B for forming a pocket P between the adjacent columns 5.

When the slide core 8 is slid in the radially outward direction, as shown in FIGS. 3A and 3B, so as to extract the pocket-forming protruding portion 8B of the slide core 8 from the pocket P of the retainer A, the slide core 8 is forcibly extracted. At this time, load for pulling the retainer A in the radially outward direction acts on the retainer.

<Injection Molding Die and Method of Manufacturing Resin Retainer Having Two Annular Sections>

Next, an embodiment of the injection molding die and a method of manufacturing the resin retainer A having two annular sections according to the embodiment of the present invention are described, with reference to the major-part enlarged sectional views of FIGS. 4A to 4D and 5A to 5D. The major-part enlarged sectional views of FIGS. 4A to 4D show the cross section of the pocket P of the resin retainer A having two annular sections. The major-part enlarged sectional views of FIGS. 5A to 5D show the cross section of the column 5 of the resin retainer A having two annular sections.

<Embodiment of Injection Molding Die>

An injection molding die D1 includes a fixed-side main body 9, a fixed-side cavity forming mold 6, a movable-side cavity forming mold 7 and slide cores 8. A direction along which the injection molding die D1 is opened and closed corresponds to the axial direction.

It should be noted that the slide cores 8 are provided in a movable side of the injection molding die, and angular pins 13 are provided in a fixed side of the injection molding die in the present embodiment.

(Fixed-Side Main Body)

The fixed-side main body 9 holds, in the circumferential direction, a plurality of angular pins 13 extending in the radially outward direction as approaching the movable-side cavity forming mold 7. In the present embodiment, the number of the angular pins 13 is the same as the number of the pockets P of the resin retainer A having two annular sections. Each of the angular pins 13 is inserted in an angular pin insertion hole 8C provided in the slide core 8. With this configuration, when moving in the axial direction (mold opening/closing direction) relative to the fixed-side main body 9, the slide cores 8 move back and forth in the radial direction.

(Fixed-Side Cavity Forming Mold)

The fixed-side cavity forming mold 6 has: a first axial mold surface 6A that is in contact with the axial end surface 3A of the annular section 3 that is one of the annular sections of the resin retainer A having two annular sections; and a first protruding portion 11A protruding from the first axial mold surface 6A (FIGS. 5A to 5D).

(Movable-Side Cavity Forming Mold)

The movable-side cavity forming mold 7 has: an inner periphery molding surface 7B that is in contact with an inner peripheral surface E of the resin retainer A having two annular sections; a second axial mold surface 7A that is in contact with the axial end surface 4A of the annular section 4 that is the other one of the annular sections of the resin retainer A having two annular sections; and a second protruding portion 12A protruding from the second axial mold surface 7A (FIGS. 5A to 5D).

The inner periphery molding surface that is in contact with the inner peripheral surface E of the resin retainer A having two annular sections may be provided in the fixed-side cavity forming mold 6 instead of the movable-side cavity forming mold 7.

(Shape and Size of First Protruding Portion and Second Protruding Portion)

Each of the first protruding portion 11A and the second protruding portion 12A shown in FIGS. 5A to 5D has a columnar shape. Diameter d of each of the protruding portions 11A and 12A is in the range from 20 to 60% of a width (a radial length) of the respective annular sections 3 and 4 of the resin retainer A having two annular sections. An axial length L of the protruding portions 11A and 12A is in the range from 5 to 50% of thickness (an axial length) of each of the annular sections 3 and 4.

The diameters d of the protruding portions 11A and 12A and the axial lengths L of the protruding portions 11A and 12A are set in the aforementioned numerical value ranges, in view of load pulling the retainer A in the radially outward direction when the slide cores 8 are opened in the radially outward direction, a required specification of strength of the retainer A, and an effect to appearances of the concave portions 11B and 12B respectively of the annular sections 3 and 4, which are formed by the protruding portions 11A and 12A. In addition, it is preferable to set L $2d$, in view of a mold life of the fixed-side cavity forming mold 6 and the movable-side cavity forming mold 7.

(Slide Cores)

Each of the slide cores 8 has the outer periphery molding surface 8A that is in contact with the outer peripheral surface F of the resin retainer A having two annular sections, and the pocket-forming protruding portion 8B for forming the pocket P between the adjacent columns 5, as mentioned above.

(Connection Mechanism)

The injection molding die D1 includes a connection mechanism B that is used for opening the movable-side cavity forming mold 7 relative to the fixed-side cavity forming mold 6, after extracting the pocket-forming protruding portions 8B of the slide cores 8 from the pocket P of the resin retainer A having two annular sections. The connection mechanism B includes, for example, a tension link 14 and a parting lock 15.

The tension link 14 has one end that is fixed to the fixed-side main body 9 by a pin 14A. A pin 14B provided in the fixed-side cavity forming mold 6 is inserted in a long hole 14C of the tension link 14.

Figure 4A:
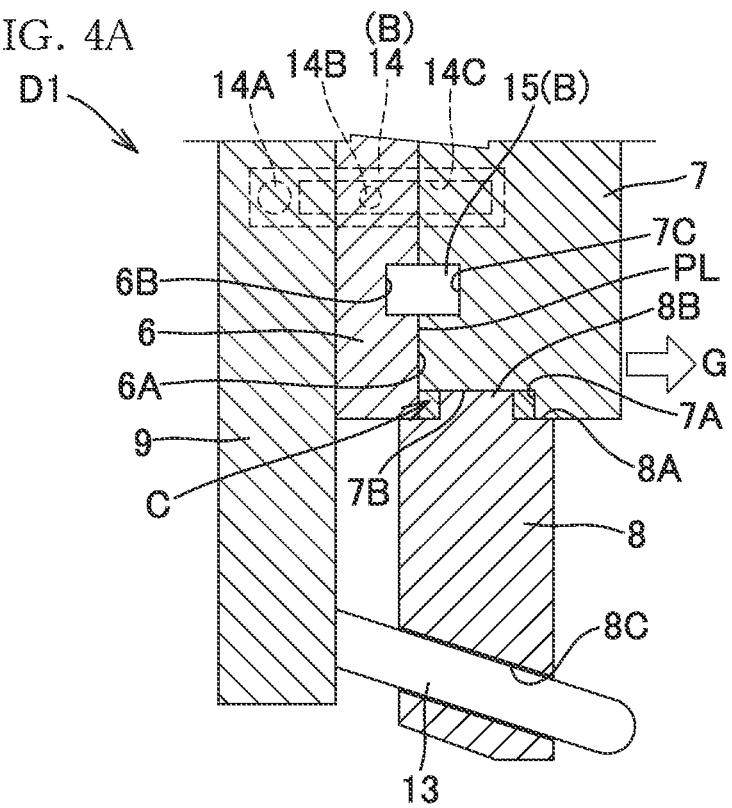
FIG. 4A is a major-part enlarged cross sectional view showing, at a cross section of a pocket of the resin retainer having two annular sections, a molten resin material charging step of charging a molten resin material in a cavity of the injection molding die, in the method of manufacturing the resin retainer having two annular sections, using the injection molding die, according to the embodiment.
Figure 5A:
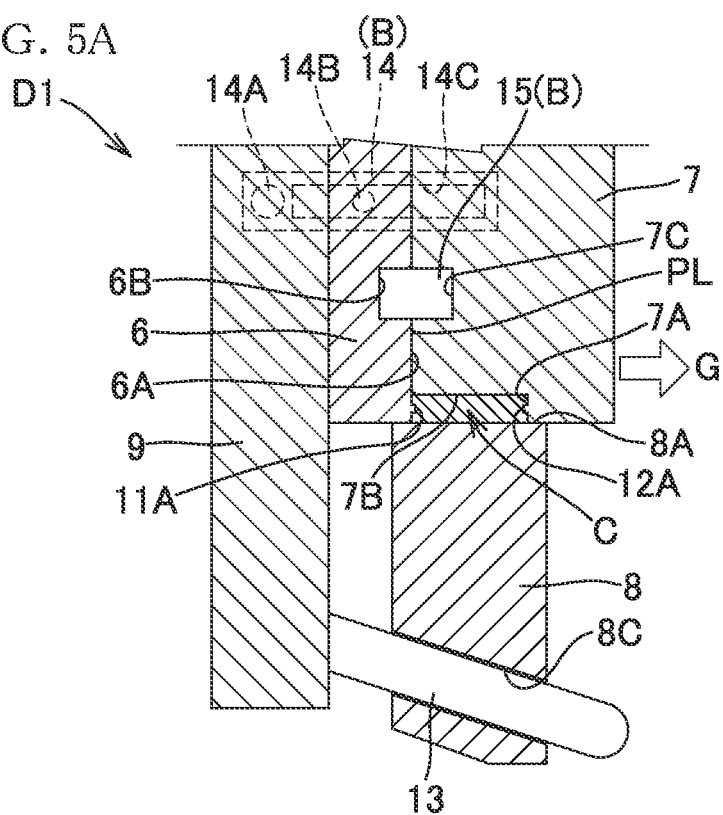
FIG. 5A is a major-part enlarged cross sectional view showing, at a cross section of the column of the resin retainer having two annular sections, the molten resin material charging step of charging the molten resin material in the cavity of the molding die, in the manufacturing method.

The parting lock 15 is fixed to the fixed-side cavity forming mold 6 with a part of the parting lock 15 being accommodated in the concave portion 6B of the fixed-side cavity forming mold 6. The parting lock 15 has a portion that protrudes toward the movable-side cavity forming mold 7. The portion is accommodated in the concave portion 7C of the movable-side cavity forming mold 7 in a state where the fixed-side cavity forming mold 6 and the movable-side cavity forming mold 7 are closed as shown in FIGS. 4A and 5A. The portion is adjusted to have a required frictional force in this state.

With such a connection mechanism B, even if the fixed-side cavity forming mold 6 and the movable-side cavity forming mold 7 move in a mold-opening direction G relative to the fixed-side main body 9 from the state shown in FIGS.

Figure 4B:
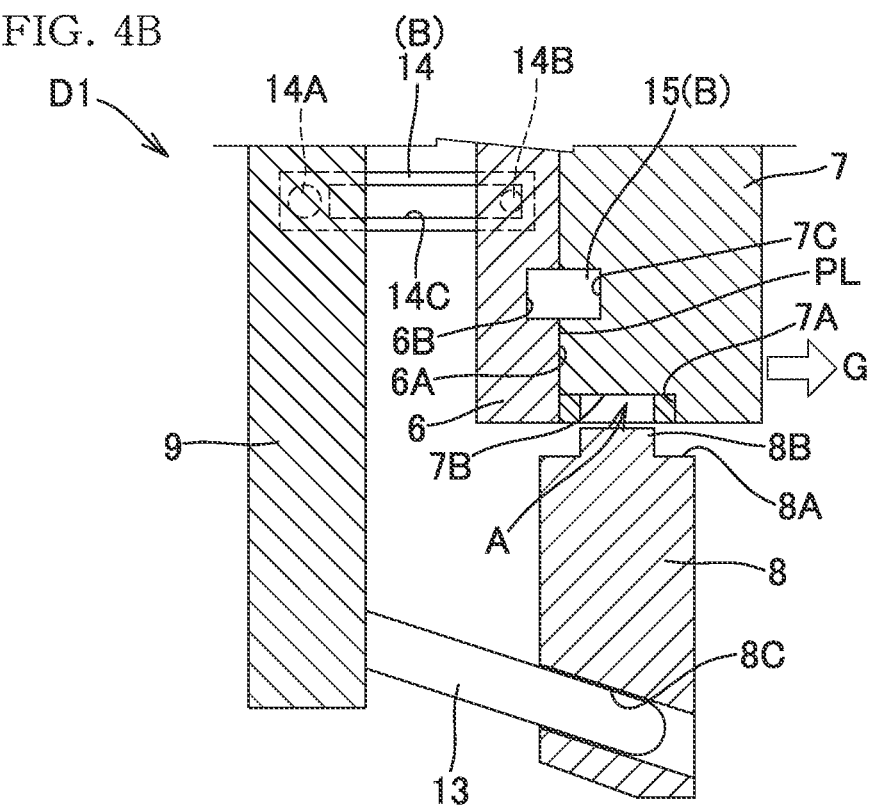
FIG. 4B is a major-part enlarged cross sectional view showing, at the cross section of the pocket of the resin retainer having two annular sections, a slide core sliding step of sliding the slide cores in the radially outward direction, in the manufacturing method.
Figure 5B:
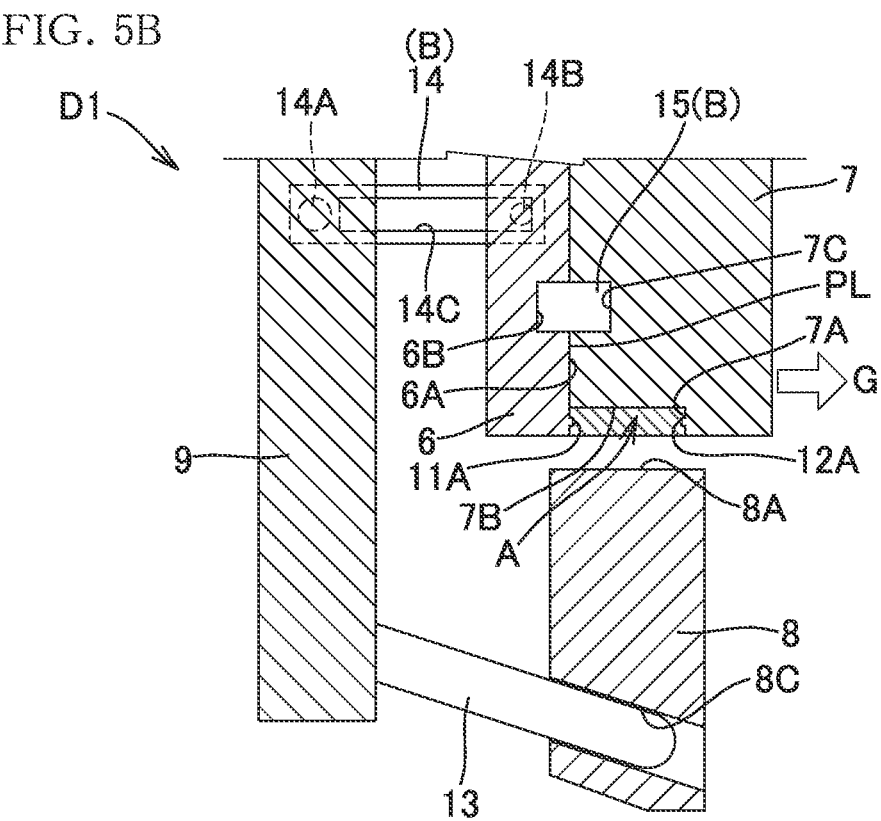
FIG. 5B is a major-part enlarged cross sectional view showing, at the cross section of the column of the resin retainer having two annular sections, the slide core sliding step of sliding the slide cores in the radially outward direction, in the manufacturing method.

4A and 5A to the state shown in FIGS. 4B and 5B, a parting surface PL between the fixed-side cavity forming mold 6 and the movable-side cavity forming mold 7 is not opened.

In the state shown in FIGS. 4B and 5B, the slide core 8 guided by the angular pins 13 is slid in the radially outward direction, and the pocket-forming protruding portion 8B of the slide core 8 moves out from the pocket P of the retainer A.

If the movable-side cavity forming mold 7 further moves in the mold-opening direction G from the state shown in FIGS. 4B and 5B to the state shown in FIGS. 4C and 5C, the fixed-side cavity forming mold 6, in which the pin 14B is positioned at the end portion of the tension link 14 in the state shown in FIGS. 4B and 5B, cannot move in the mold-opening direction G together with the movable-side cavity forming mold 7. Accordingly, the movable-side cavity forming mold 7 moves relative to the fixed-side cavity forming mold 6, thereby allowing the parting surface PL between the fixed-side cavity forming mold 6 and the movable-side cavity forming mold 7 to be opened.

As described above, after the pocket-forming protruding portions 8B of the slide cores 8 are extracted from the pocket P of the resin retainer A having two annular sections, the movable-side cavity forming mold 7 can be opened relative to the fixed-side cavity forming mold 6 by the connection mechanism B.

<Method of Manufacturing Resin Retainer Having Two Annular Sections>

A method of manufacturing the resin retainer A having two annular sections according to the embodiment of the present invention includes a molten resin material charging step, a molten resin material cooling step, a slide core sliding step, a mold opening step, and a molded article taking-out step, which are performed using the injection molding die D1 having the configuration described above.

(Molten Resin Material Charging Step)

After the injection molding die D1 is closed for clamping the molding die, as shown in FIGS. 4A and 5A, a molten resin material is charged in a cavity C of the injection molding die D1, from a gate (not shown).

(Molten Resin Material Cooling Step)

Then, the molten resin material is cooled and solidified.

(Slide Core Sliding Step)

Thereafter, the movable-side cavity forming mold 7 and the slide core 8 are moved in the mold-opening direction indicated by an arrow G in FIGS. 4A and 5A, thereby allowing the injection molding die D1 to be in a state shown in FIGS. 4B and 5B. In this state, the parting surface PL between the fixed-side cavity forming mold 6 and the movable-side cavity forming mold 7 is not opened. Under this situation, the slide cores 8 slide in the radially outward direction, and the pocket-forming protruding portions 8B of the slide cores 8 are extracted from the pocket P of the resin retainer A having two annular sections.

(Mold Opening Step)

Thereafter, the movable-side cavity forming mold 7 is further moved in the mold-opening direction indicated by the arrow G in FIGS. 4B and 5B, thereby allowing the injection molding die D1 to be in a state shown in FIGS. 4C and 5C. In this state, the parting surface PL between the fixed-side cavity forming mold 6 and the movable-side cavity forming mold 7 is opened. The movable-side cavity forming mold 7 is further moved, in the mold-opening direction indicated by the arrow G in FIGS. 4C and 5C, to a position shown in FIGS. 4D and 5D.

(Molded Article Taking-Out Step)

Figure 4D:
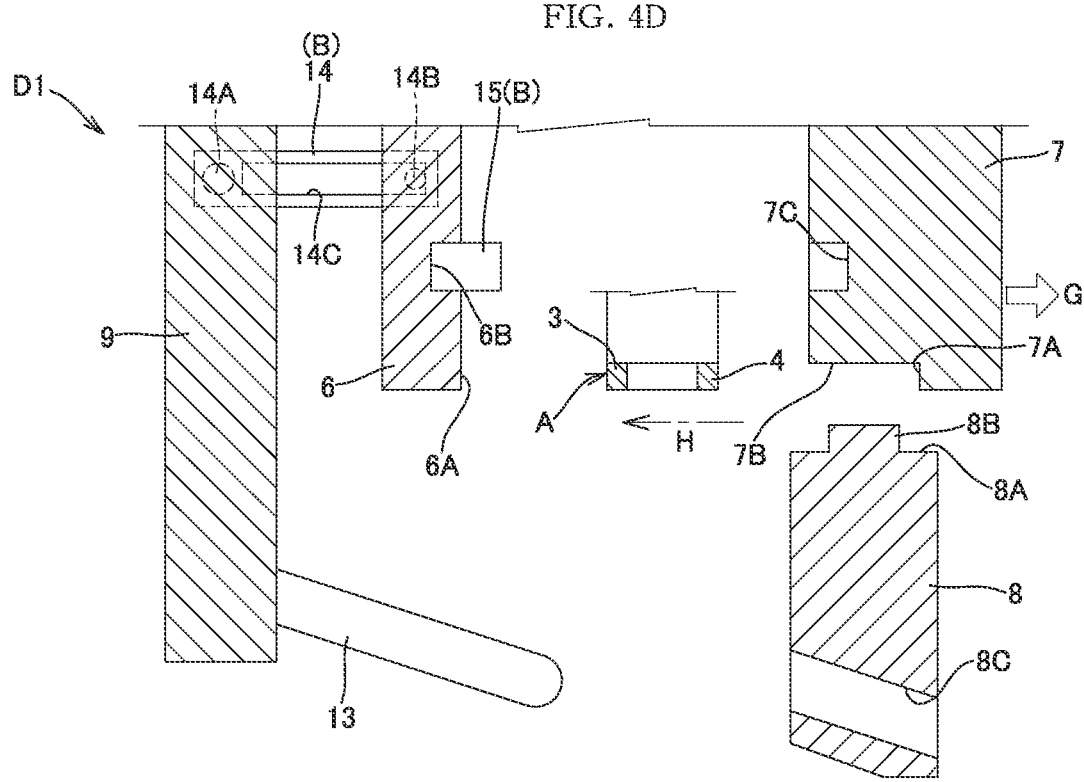
FIG. 4D is a major-part enlarged cross sectional view showing, at the cross section of the pocket of the resin retainer having two annular sections, a molded article taking-out step of taking a molded resin retainer having two annular sections out from the injection molding die, in the manufacturing method.
Figure 5D:
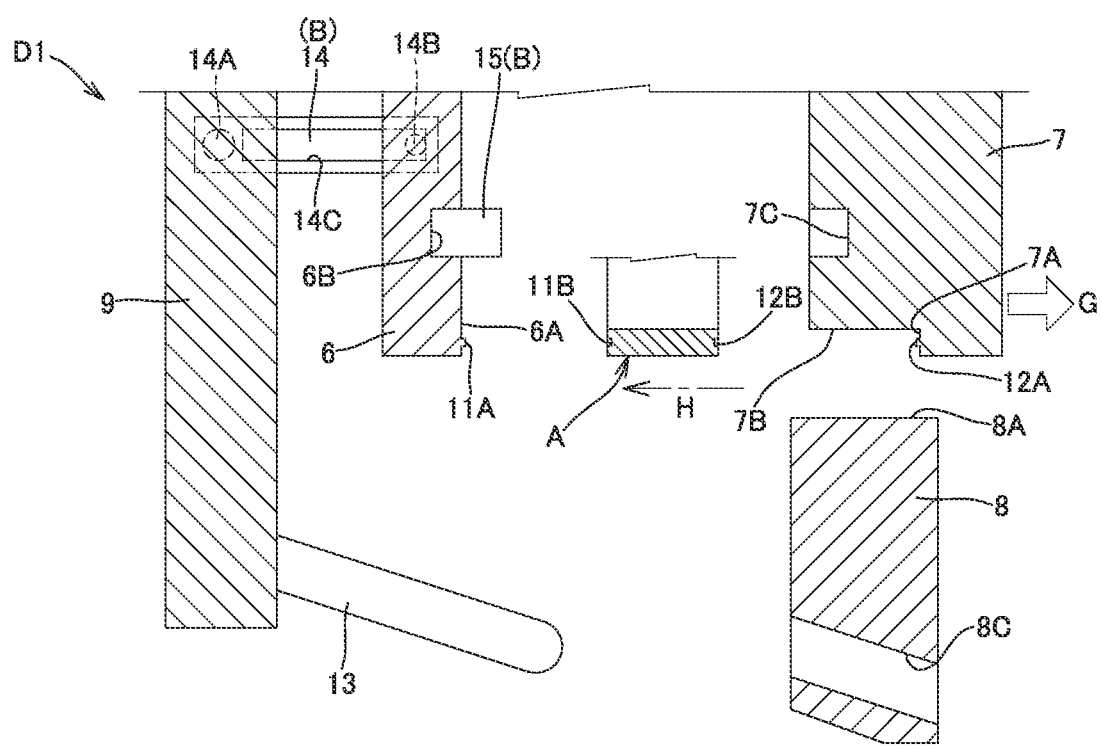
FIG. 5D is a major-part enlarged cross sectional view showing, at the cross section of the column of the resin retainer having two annular sections, the molded article taking-out step of taking the molded resin retainer having two annular sections out from the injection molding die, in the manufacturing method.

Then, as shown in FIGS. 4D and 5D, the resin retainer A having two annular sections, which is a molded article, is pushed in a protruding direction indicated by an arrow H, using an ejector pin (not shown) provided in the movable-side cavity forming mold 7, to thereby taking the resin retainer A having two annular sections out from the injection molding die D1.

The second protruding portion 12A formed integrally with the movable-side cavity forming mold 7 as shown in FIGS. 5A to 5D may not be formed integrally with the movable-side cavity forming mold 7, but may be formed separately from the movable-side cavity forming mold 7. For example, it is assumed that a distal end of the ejector pin provided in the movable-side cavity forming mold 7 serves as the second protruding portion 12A. The distal end of the ejector pin that is used in the molded article taking-out step and has the function of pushing out the resin retainer A having two annular sections, which is a molded article, serves as the second protruding portion 12A, to thereby simplify a mold structure.

The first protruding portion 11A formed integrally with the fixed-side cavity forming mold 6 as shown in FIGS. 5A to 5D may not be formed integrally with the fixed-side cavity forming mold 6, but may be formed separately from the fixed-side cavity forming mold 6. For example, it is assumed that a distal end of a core pin provided in the fixed-side cavity forming mold 6 serves as the first protruding portion 11.

Here, the first protruding portion 11A and the second protruding portion 12A are not limited to have a columnar shape, but may have a polygonal column shape, an elliptical column shape, and so on.

<Another Embodiment of Injection Molding Die>

Next, another embodiment of the injection molding die is described, with reference to the major-part enlarged sectional views of FIGS. 6A to 6D and 7A to 7D. The major-part enlarged sectional views of FIGS. 6A to 6D show a cross section of the pocket P of the resin retainer A having two annular sections. The major-part enlarged sectional views of FIG. 7A to 7D show a cross section of the column 5 of the resin retainer A having two annular sections.

Figure 6A:
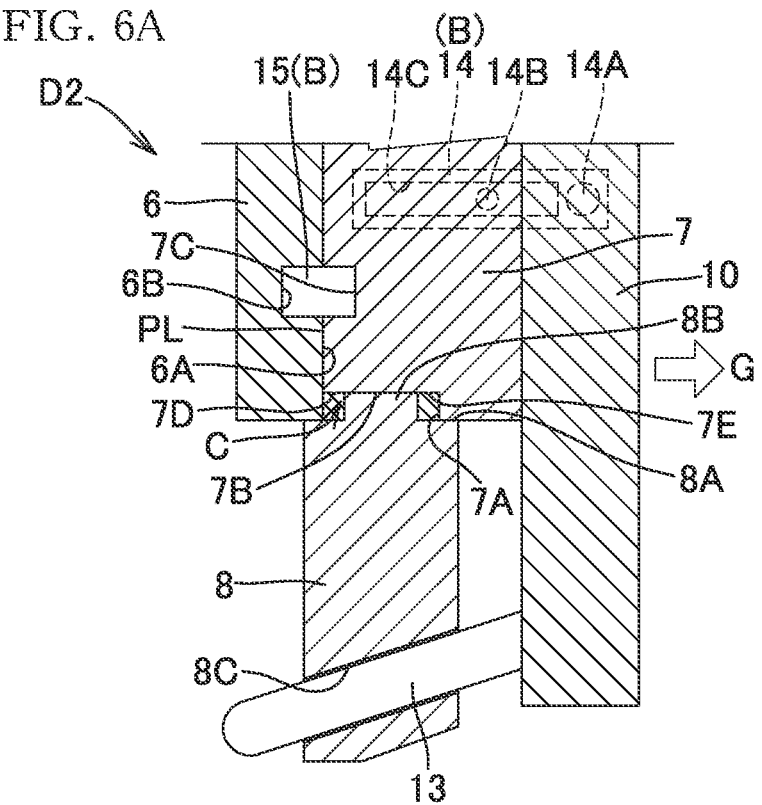
FIG. 6A is a major-part enlarged cross sectional view showing, at a cross section of a pocket of a resin retainer having two annular sections, a molten resin material charging step of charging a molten resin material in a cavity of an injection molding die, in a method of manufacturing the resin retainer having two annular sections, using an injection molding die, according to another embodiment.
Figure 6B:
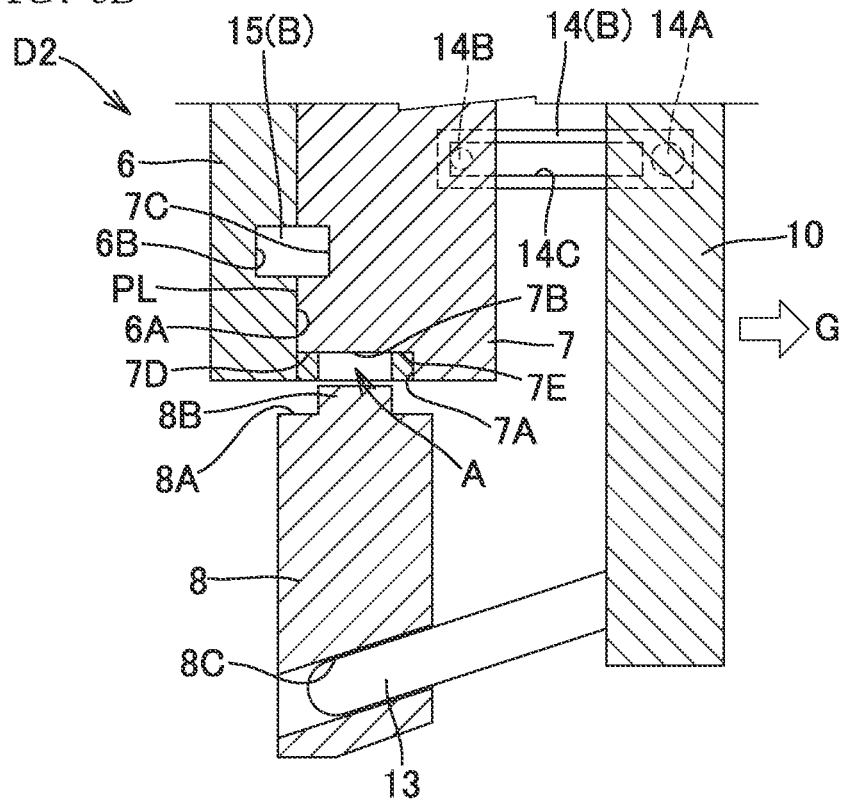
FIG. 6B is a major-part enlarged cross sectional view showing, at the cross section of the pocket of the resin retainer having two annular sections, a slide core sliding step of sliding slide cores in a radially outward direction in the manufacturing method.
Figure 7A:
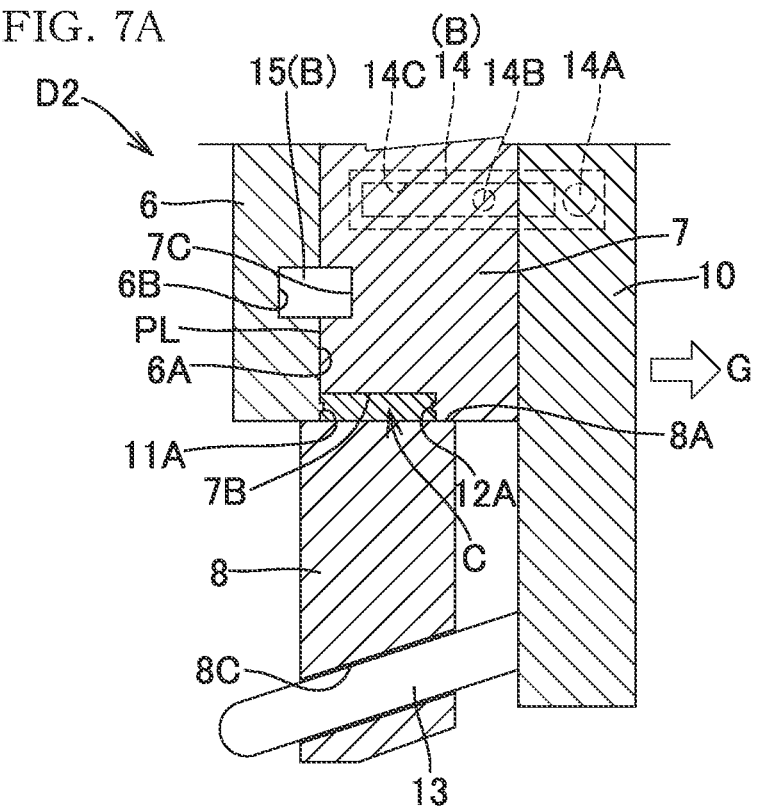
FIG. 7A is a major-part enlarged cross sectional view showing, at a cross section of a column of the resin retainer having two annular sections, the molten resin material charging step of charging the molten resin material in the cavity of the molding die, in the manufacturing method.
Figure 7B:
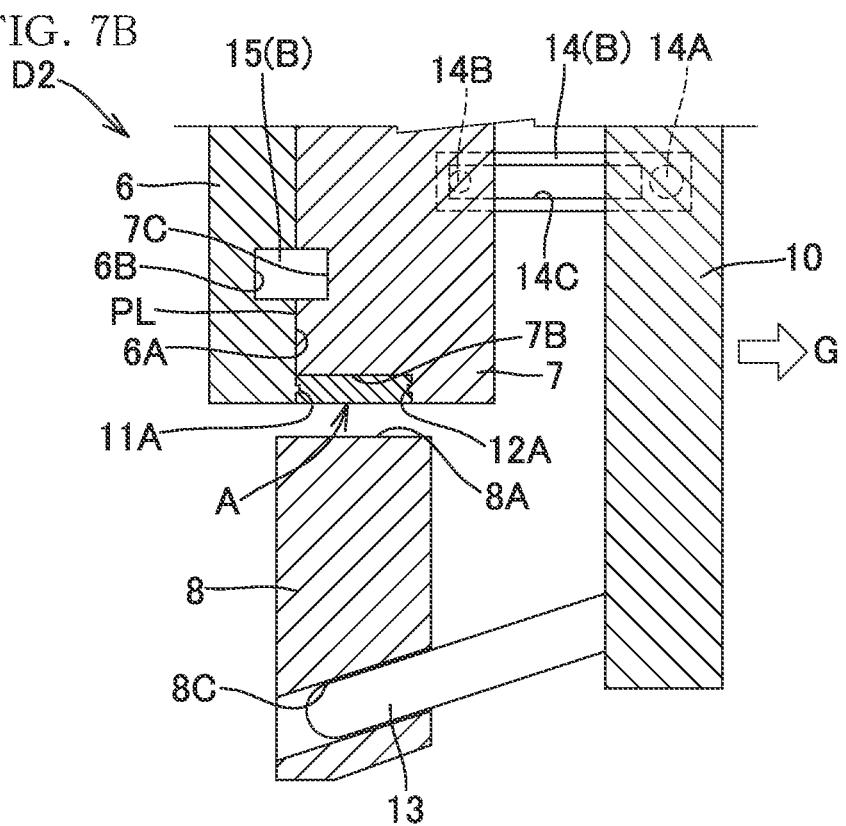
FIG. 7B is a major-part enlarged cross sectional view showing, at the cross section of the column of the resin retainer having two annular sections, the slide core sliding step of sliding the slide cores in the radially outward direction, in the manufacturing method.

FIGS. 6A and 7A show a molten resin material charging step, FIGS. 6B and 7B show a slide core sliding step, FIGS. 6C and 7C show a mold opening step, and FIGS. 6D and 7D show a molded article taking-out step. These steps are the same as those in the method of manufacturing the resin retainer having two annular sections.

An injection molding die D2 includes a fixed-side cavity forming mold 6, a movable-side cavity forming mold 7, a movable-side main body 10, and slide cores 8. A direction along which the injection molding die D2 is opened and closed is the axial direction.

It should be noted that the slide cores 8 are provided in the fixed side of the injection molding die, and an angular pin 13 is provided in the movable side of the injection molding die in the present embodiment.

The fixed-side cavity forming mold 6, the movable-side cavity forming mold 7, and the slide cores 8 are the same as those shown in FIGS. 4A to 4D, and FIGS. 5A to 5D, so that the detailed description of them is omitted.

(Movable-Side Main Body)

A movable-side main body 10 holds multiple angular pins 13 extending in the radially outward direction as approaching the fixed-side cavity forming mold 6. In the present embodiment, the number of the angular pins 13 is the same as the number of pockets P of the resin retainer A having two annular sections. Each of the angular pins 13 is inserted in an angular pin insertion hole 8C provided in the slide core 8. With this configuration, if the movable main body 10 is moved in the axial direction (mold opening and closing direction), the slide cores 8 move back and forth in the radial direction.

(Connection Mechanism)

The injection molding die D2 includes a connection mechanism B that is used for opening the movable-side cavity forming mold 7 relative to the fixed-side cavity forming mold 6 after pocket-forming protruding portions 8B of the slide cores 8 are extracted from the pocket P of the resin retainer A having two annular sections. The connection mechanism B includes, for example, a tension link 14 and a parting lock 15.

The tension link 14 has one end that is fixed to the movable-side main body 10 by a pin 14A. A pin 14B provided in the movable-side cavity forming mold 7 is inserted in a long hole 14C of the tension link 14.

The parting lock 15 is fixed to the fixed-side cavity forming mold 6 with a part of the parting lock 15 being accommodated in the concave portion 6B of the fixed-side cavity forming mold 6. The parting lock 15 has a portion that protrudes toward the movable-side cavity forming mold 7. The portion is accommodated in a concave portion 7C of the movable-side cavity forming mold 7 in a state where the fixed-side cavity forming mold 6 and the movable-side cavity forming mold 7 are closed as shown in FIGS. 6A and 7A. The portion is adjusted to have a required frictional force in this state.

With such a connection mechanism B, even if the movable-side main body 10 moves relative to the fixed-side cavity forming mold 6 and the movable-side cavity forming mold 7 in the mold-opening direction G from the state shown in FIGS. 6A and 7A to the state shown in FIGS. 6B and 7B, a parting surface PL between the fixed-side cavity forming mold 6 and the movable-side cavity forming mold 7 is not opened.

In the state shown in FIGS. 6B and 7B, the slide core 8 guided by the angular pins 13 is slid in the radially outward direction, and the pocket-forming protruding portion 8B of the slide core 8 moves out from the pocket P of the retainer A.

If the movable-side main body 10 further moves in the mold-opening direction G from the state shown in FIGS. 6B and 7B to the state shown in FIGS. 6C and 7C, the movable-side cavity forming mold 7, in which a pin 14B is positioned at the end portion of the tension link 14 in the state shown in FIGS. 6B and 7B, moves in the mold-opening direction G together with the movable-side main body 10. Accordingly, the movable-side cavity forming mold 7 moves relative to the fixed-side cavity forming mold 6, thereby allowing the parting surface PL between the fixed-side cavity forming mold 6 and the movable-side cavity forming mold 7 to be opened.

As described above, after the pocket-forming protruding portions 8B of the slide cores 8 are extracted from the pocket P of the resin retainer A having two annular sections, the movable-side cavity forming mold 7 can be opened relative to the fixed-side cavity forming mold 6 by the connection mechanism B.

In the mold structure described above, the parting line between the slide cores 8 adjacent to each other in the circumferential direction is preferably formed within a concave portion formed between both axial end portions of the column of the resin retainer having two annular sections, as in the invention of Patent Literature 5, for example.

<Effect>

(1) The method of manufacturing the resin retainer A having two annular sections, according to the present invention, includes the slide core sliding step in which the slide cores 8 are slid in the radially outward direction so as to allow the pocket-forming protruding portions 8B of the slide cores 8 to be extracted from the pocket P of the resin retainer A having two annular sections, before the mold opening step in which the movable-side cavity forming mold 7 is opened relative to the fixed-side cavity forming mold 6.

(2) In the injection molding dies D1 and D2 used in the injection molding in the method of manufacturing the resin retainer A having two annular sections, according to the present invention, the fixed-side cavity forming mold 6 has the first protruding portion 11A protruding from the first axial mold surface 6A that is in contact with the axial end surface 3A of the annular section 3 that is one of the annular sections of the resin retainer A having two annular sections, and the movable-side cavity forming mold 7 has the second protruding portion 12A protruding from the second axial mold surface 7A that is in contact with the axial end surface 4A of the annular section 4 that is the other one of the annular sections of the resin retainer A having two annular sections.

(3) Accordingly, in the axial end surfaces 3A and 4A of the respective annular sections 3 and 4 in pair of the molded resin retainer A having two annular sections, the concave portions 11B and 12B are respectively formed, to which the first protruding portion 11A of the fixed-side cavity forming mold 6 and the second protruding portion 12A of the movable-side cavity forming mold 7 are respectively fitted. In this state, the slide core sliding step is performed.

(4) Accordingly, a pair of the annular sections 3 and 4 are supported by the fitting of the concave portion and the protruding portion in the axial direction between the fixed-side cavity forming mold 6 and the movable-side cavity forming mold 7, even if, in the slide core sliding step, the forcible extraction is required at the time of extracting the pocket-forming protruding portions 8B of the slide cores 8 from the pocket P of the resin retainer A having two annular sections or a portion around the pocket P of the resin retainer A having two annular sections sticks to each of the slide cores 8 due to the mold shrinkage. Therefore, a pair of the annular sections 3 and 4 are prevented from deforming in the radial direction.

The above description of the embodiments are all examples, and thus the present invention is not limited thereto. Various improvements and modifications can be applied to the present invention without departing from the scope of the present invention.

For example, the connection mechanism included in the injection molding die of the present invention is not limited to the connection mechanism B formed of the tension link 14 and the parting lock 15, in the injection molding dies D1 and D2. The connection mechanism provided in the injection molding die according to the present invention is merely required to have a function similar to that of the connection mechanism B. Specifically, the connection mechanism is merely required to have a function in which the movable-side cavity forming mold 7 is opened relative to the fixed-side cavity forming mold 6, after the pocket-forming protruding portions 8B of the slide cores 8 are extracted from the pocket P of the resin retainer A having two annular sections.

REFERENCE SIGNS LIST

A Resin retainer having two annular sections
B Connection mechanism
C Cavity
D1, D2 Injection molding die
E Inner peripheral surface
F Outer peripheral surface
G Mold-opening direction
H Protruding direction
P Pocket
PL Parting surface
1 Cylindrical roller bearing retainer
2 Ball bearing retainer
3, 4 Annular section
3A, 4A Axial end surface
5 Column
6 Fixed-side cavity forming mold
6A First axial mold surface
6B Concave portion
7 Movable-side cavity forming mold
7A Second axial mold surface
7B Inner periphery molding surface
7C Concave portion
8 Slide core
8A Outer periphery molding surface
8B Pocket-forming protruding portion
8C Angular pin insertion hole
9 Fixed-side main body
10 Movable-side main body
11A First protruding portion
11B Concave portion
12A Second protruding portion
12B Concave portion
13 Angular pin
14 Tension link
14A, 14B Pin
14C Long hole
15 Parting lock

The invention claimed is:

1. A method of manufacturing a resin retainer having two annular sections, by injection molding,
the retainer having a shape in which annular sections in pair, which are separated from each other in an axial direction, are connected by a plurality of columns provided in a circumferential direction of the annular sections at an equal interval,
the injection molding being performed using an injection molding die that includes:
a fixed-side cavity forming mold;
a movable-side cavity forming mold; and
slide cores,
the fixed-side cavity forming mold having: a first axial mold surface that is in contact with an axial end surface of a first annular section of the annular sections of the retainer; and a first protruding portion protruding from the first axial mold surface,
the movable-side cavity forming mold having: a second axial mold surface that is in contact with an axial end surface of a second annular section of the annular sections of the retainer; and a second protruding portion protruding from the second axial mold surface,
one of the fixed-side cavity forming mold and the movable-side cavity forming mold having an inner periphery molding surface that is in contact with an inner peripheral surface of the retainer, and
each of the slide cores, which has: an outer periphery molding surface that is in contact with an outer peripheral surface of the retainer; and a pocket-forming protruding portion for forming a pocket between the columns adjacent to each other,
the method comprising:
a molten resin material charging step of charging a molten resin material in a cavity of the injection molding die for molding the resin retainer, after the fixed-side cavity forming mold, the movable-side cavity forming mold, and the slide core are closed and clamped;
a molten resin material cooling step of cooling and solidifying the molten resin material that has been charged in the cavity in the molten resin material charging step;
a slide core sliding step of sliding the slide cores in a radially outward direction to extract the pocket-forming protruding portions of the slide cores from the pockets of the resin retainer in a state where a parting surface between the fixed-side cavity forming mold and the movable-side cavity forming mold is not opened, after the molten resin material charging step and the molten resin material cooling step are performed;
a mold opening step of opening the parting surface by moving the movable-side cavity forming mold relative to the fixed-side cavity forming mold, after the slide core sliding step is performed; and
a molded article taking-out step of taking the resin retainer molded in the cavity of the injection molding die out from the injection molding die, after the mold opening step is performed.

2. The method of manufacturing a resin retainer having two annular sections, according to claim 1, wherein
the first protruding portion of the fixed-side cavity forming mold and the second protruding portion of the movable-side cavity forming mold are provided to interpose therebetween each of the columns of the retainer.

3. The method of manufacturing a resin retainer having two annular sections, according to claim 1, wherein
the second protruding portion of the movable-side cavity forming mold is a distal end portion of an ejector pin for pushing a molded article in the molded article taking-out step, the ejector pin being provided in the movable-side cavity forming mold.

4. The method of manufacturing a resin retainer having two annular sections, according to claim 1, wherein
the injection molding die includes a fixed-side main body and a movable-side main body, and an angular pin is provided in the fixed-side main body or the movable-side main body, the angular pin being inserted in an angular pin insertion hole provided in the slide core, and
the injection molding die includes a connection mechanism that allows the movable-side cavity forming mold to be opened relative to the fixed-side cavity forming mold, after the pocket-forming protruding portions of the slide cores are extracted from the pockets of the retainer.

* * * * *